Aug. 20, 1963 T. J. McLARNON ETAL 3,101,232
PHOTOGRAPHIC RECORDING APPARATUS
Filed March 23, 1960 6 Sheets-Sheet 1

INVENTORS
THOMAS J. MCLARNON
JOHN B. STARK
CHARLES O. SUTTON

*Flehr & Swain*
ATTORNEYS

Aug. 20, 1963　　　T. J. McLARNON ETAL　　　3,101,232
PHOTOGRAPHIC RECORDING APPARATUS
Filed March 23, 1960　　　　　　　　　　　　　　6 Sheets-Sheet 3
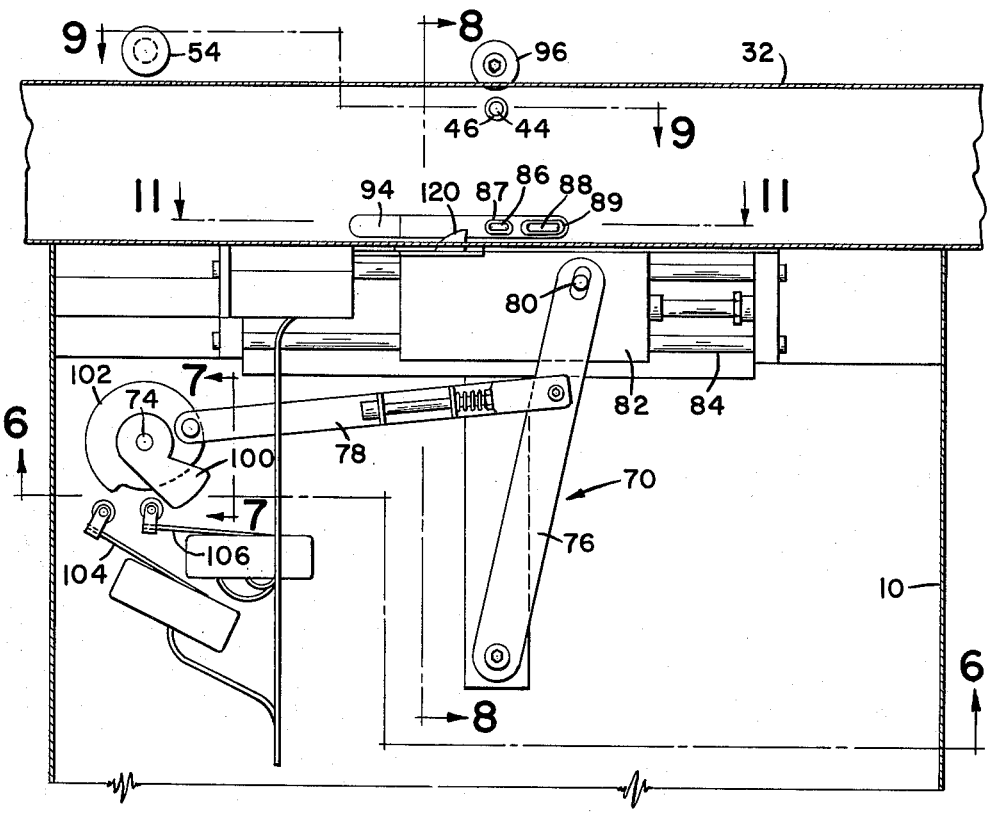
FIG. 5
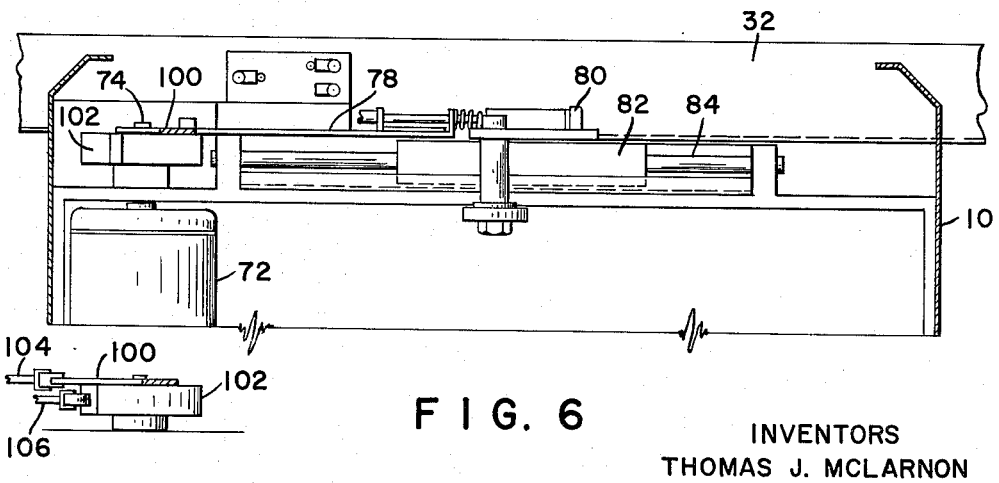
FIG. 6
FIG. 7
INVENTORS
THOMAS J. MCLARNON
JOHN B. STARK
CHARLES O. SUTTON
*Flehr & Swain*
ATTORNEYS

INVENTORS
THOMAS J. MCLARNON
JOHN B. STARK
CHARLES O. SUTTON

ATTORNEYS

INVENTORS
THOMAS J. MCLARNON
JOHN B. STARK
CHARLES O. SUTTON

ATTORNEYS

Aug. 20, 1963
T. J. McLARNON ETAL
3,101,232
PHOTOGRAPHIC RECORDING APPARATUS
Filed March 23, 1960
6 Sheets-Sheet 6
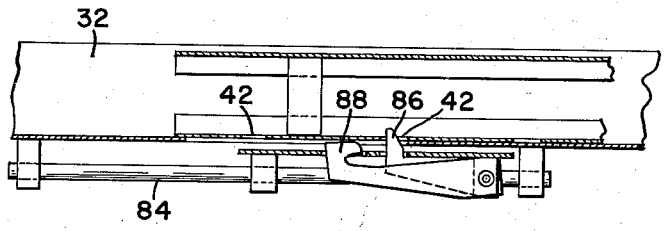
F I G. 13
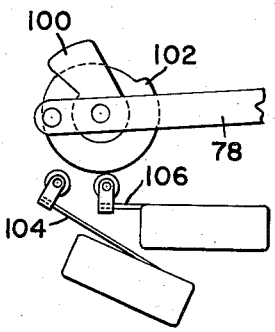
F I G. 18
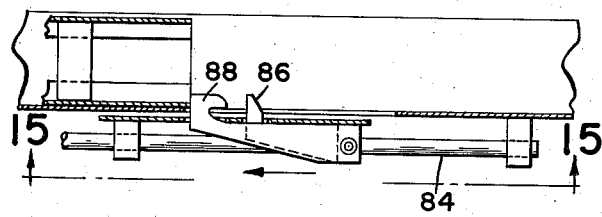
F I G. 14
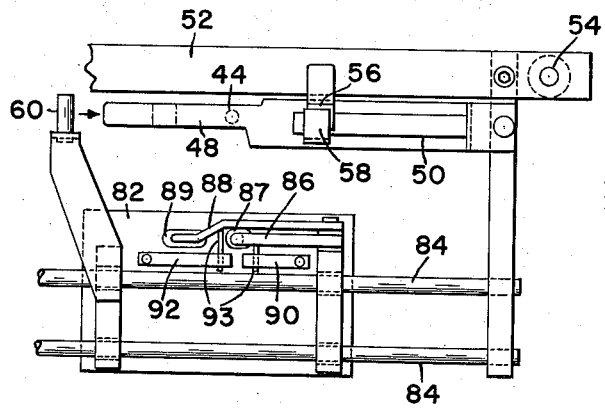
F I G. 15
INVENTORS
THOMAS J. MCLARNON
JOHN B. STARK
CHARLES O. SUTTON
Flehr & Swain
ATTORNEYS

United States Patent Office 3,101,232
Patented Aug. 20, 1963

3,101,232
PHOTOGRAPHIC RECORDING APPARATUS
Thomas J. McLarnon, San Rafael, John B. Stark, Lafayette, and Charles O. Sutton, Alameda, Calif., assignors, by direct and mesne assignments, to Foremost Dairies, Inc., San Francisco, Calif., a corporation of New York
Filed Mar. 23, 1960, Ser. No. 17,183
5 Claims. (Cl. 346—107)

This invention relates generally to photographic recording apparatus, and more particularly to such apparatus useful in recording the butterfat content of various dairy products.

An efficient determination of the fat content of milk and milk products is essential to the milk processor. Not only is the cost of his raw supplies based on fat content, but his products distributed to the market are generally standardized to a definite fat percentage (frequently under state supervision). Plant production and processing efficiencies are also customarily phrased in terms of milk fat, or fat losses. Proper performance of the fat test is therefore a matter of prime concern to the milk-plant operator.

In the United States, the Babcock test is customarily used. In this test sulfuric acid is employed to dissolve the solids-nonfat content and to produce heat to aid in the coalescing of the fat globules. A special test bottle containing the mixture is centrifuged to separate the fat completely from the acid mixture, which has a higher specific gravity. The fat rises into a calibrated neck forming a part of this test bottle. The customary practice is to measure the column of fat with a pair of dividers, one point being placed at the bottom of the column and the other at the top. The dividers are then shifted to position the lower point at the zero mark of the graduations, the upper point indicating the percentage of fat. This procedure presents the difficulty that it is frequently inaccurate, is time consuming, and makes no allowance for inconsistencies in the graduations of the various test bottles employed. In addition, human errors (e.g., slippage in the dividers, etc.) are easily introduced.

In general, it is an object of the present invention to provide an improved procedure and apparatus for determining the fat content of milk and milk products.

Another object of the invention is to provide a procedure and apparatus of this character which will automatically photograph and record the fat content of Babcock test samples, on a continuous or a semi-continuous basis.

A further object of the invention is to provide such a procedure and apparatus which virtually eliminates measurement and recording errors of the type heretofore experienced, and which makes possible a more efficient and speedier processing of the samples for purposes of recording the fat content.

Other objects and advantages of the present invention will be apparent from the following description of an exemplary embodiment thereof and from the drawings in which:

FIGURE 5 is an enlarged detail view similar to FIGURE 3, showing generally the advancing mechanism for the trays;

FIGURE 6 is a view in vertical section along the line 6—6 of FIGURE 5;

FIGURE 7 is a detail view along the line 7—7 of FIGURE 5;

FIGURES 11 to 14 are similar views along the line 11—11 of FIGURE 5, showing various stages in the operation of the advancing mechanism;

FIGURE 15 is a view in bottom plan of the structure illustrated in FIGURES 9 to 14;

FIGURES 16 to 18 are plan views of cams in a control mechanism, showing different operating positions of the parts.

Figure 1:
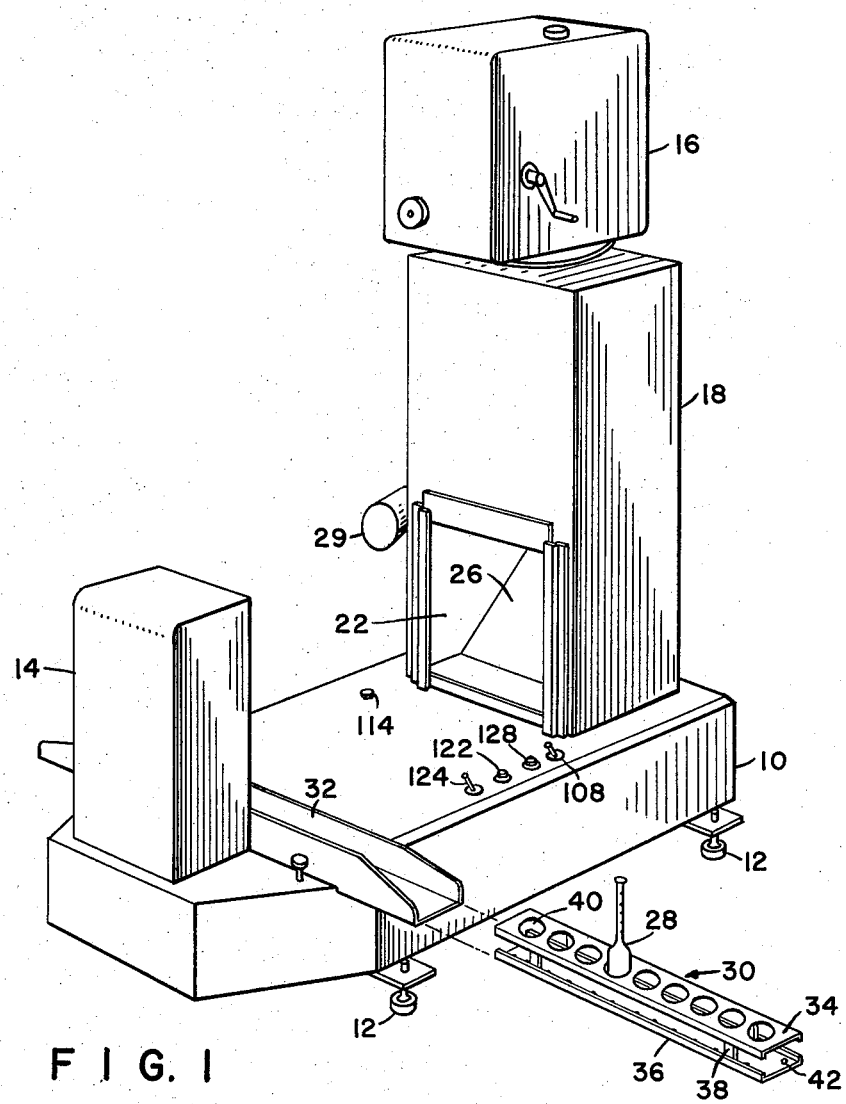
FIGURE 1 is a perspective view of a photographic recording apparatus embodying the invention, showing also a sample tray construction useful with the apparatus.

Generally stated, the present invention relates to a photographic recording device including a recording camera and light source, which may be suitably supported on a common base or frame, and guide means in the focal plane of the camera for the support of objects to be photographed and recorded. Preferably trays (movable in the guide means) are provided to support objects to be photographed in precise dimensional relationship with respect to the light source and camera. The invention also contemplates the provision of circuit means responsive to movement of the trays to energize the camera at a position of register of each object being photographed. The device is particularly adapted to the continuous automatic, or semi-automatic, photographing and recording of test samples obtained from the Babcock test for butterfat content.

*General Arrangement (FIGURES 1, 3 and 4)*

A preferred embodiment of the invention includes a base or housing 10 supported on adjustable legs 12, and mounting a light source 14 at one end and a recording camera 16 at the other. The camera is preferably of the automatic copying type, of any suitable design. In the illustrated apparatus, the camera is supported on a lighttight pedestal 18, and has a lens 20 adapted to receive images reflected through an opening 22 on the side of the pedestal facing the light source. Preferably the images are reflected to the lens by means of a mirror 26 positioned at an appropriate angle relative to the base.

During operation, the camera functions to photograph a silhouette of an object 28 positioned between it and the light source, and to record such photograph in sequence on film contained within the camera. Where information on the front of the object is also to be recorded, a secondary light source 29 can be employed in the manner indicated in FIGURES 1 and 4.

Figure 2:
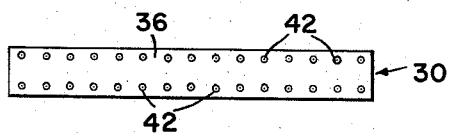
FIGURE 2 is a detail view, in bottom plan, of the tray.

In accordance with the present invention, each object 28 to be photographed and recorded is moved in automatic sequence to a position of register in the focal plane of the camera, between the camera and the light source. As illustrated in FIGURE 1, the objects 28 (e.g. Babcock test bottles) are preferably inserted in trays 30 adapted to movement in a track or guide means 32 extending transversely of the base 10. The trays 30 can be suitably constructed of upper and lower plate members 34 and 36 held in spaced relation with respect to one another by the support members 38. The upper plates 34 are provided with openings 40 to receive the test bottles. The bottom plate 36 is provided with lengthwise rows of apertures 42 (FIGURE 2) which are spaced from one another a distance determined by the desired stepwise movement of the trays in the guide means 32.

Figure 9:
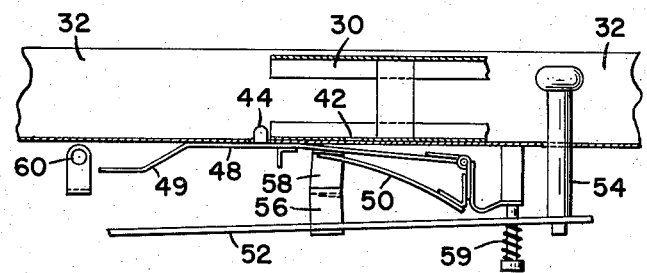
FIGURES 9 and 10 are views in vertical section along the line 9—9 of FIGURE 5, showing different operating positions of a tray positioning mechanism.
Figure 10:
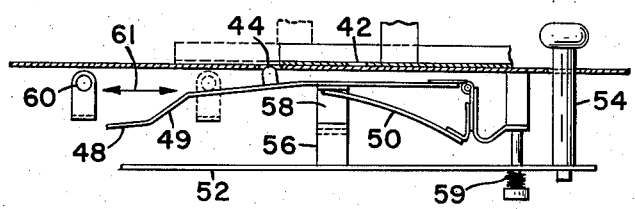

Holding Mechanism (FIGURES 5, 9 and 10)

In the operation of the apparatus, it is desirable that each sample 28 be firmly held in a desired position of register between the light source and the camera at the time it is photographed. This holding function is performed in the illustrated apparatus by successive operations of a spring biased button or pawl 44, which is adapted to protrude upwardly through a slot 46 in the floor of the guide 32. In its "up" position, the pawl 44 is engageable in an aperture 42 in the row nearest to the light source 14.

The pawl 44 is supported at the free end of a pivot arm 48 and is normally biased into an up position relative to the slot 46 by a leaf spring 50 (FIGURE 9). Manual operation of the arm 48 to depress the pawl 44 can be obtained by a second pivot arm 52 and handle extension 54, through co-action of the lugs 56 and 58 carried by these arms. The arm 52 is likewise normally biased into an up position by a spring 59 engaged with the frame.

As best illustrated in FIGURE 9, the pawl 44 presents an obstruction to accidental entry of a tray into the apparatus. However, upon depressing the handle 54, the tray can be advanced to its first operating position, as indicated by the dotted line position of FIGURE 10. In the latter position, the pawl 44 will engage in the first aperture 42, and thereby position the tray for the first photographic sequence. In subsequent operations, during which the advancing mechanism operates to successively re-position the tray, the arm 48 and pawl 44 are depressed by the reciprocatory movements of the actuator 60, as will appear.

Advancing Mechanism (FIGURES 3, 5 to 8, and 11 to 15)

Figure 3:
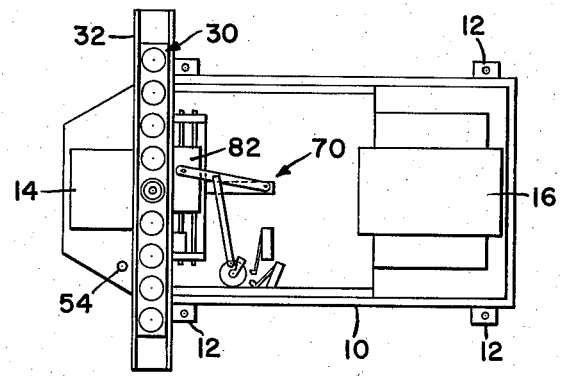
FIGURE 3 is a top plan view of the apparatus of FIGURE 1, with parts removed to show the underlying structure.
Figure 4:
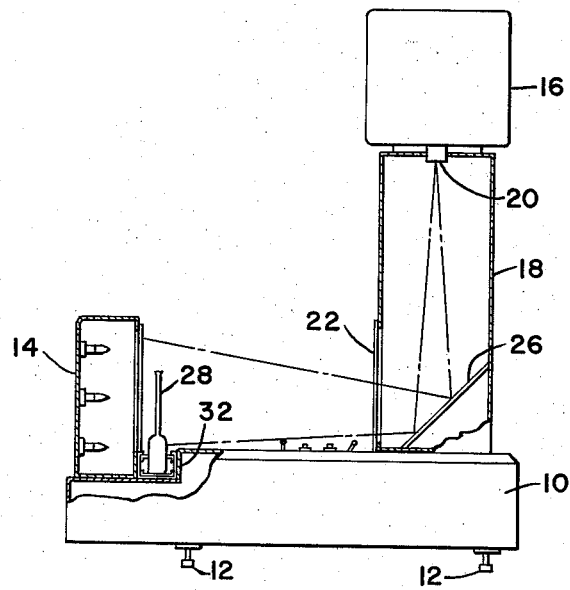
FIGURE 4 is a view in section and side elevation thereof.
Figure 8:
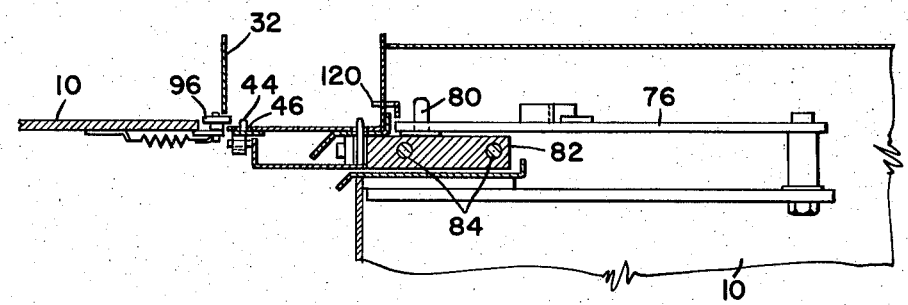
FIGURE 8 is a view in section along the line 8—8 of FIGURE 5.
Figure 19:
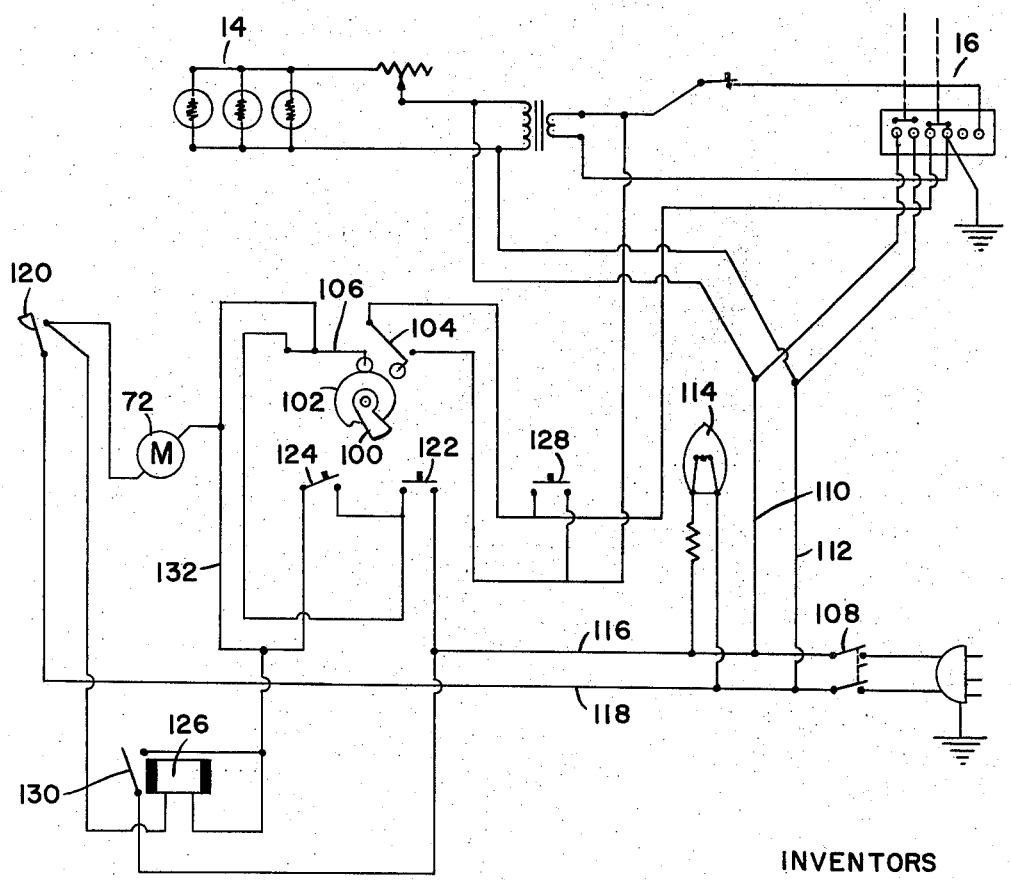
FIGURE 19 is a schematic view representing an electrical circuit adapted to control the operation of the apparatus.

As best illustrated in FIGURE 3, an advancing mechanism 70 is positioned adjacent the guide means 32. This mechanism functions to engage and move trays 30 in the guide 32 between successive positions of photographic register of the samples 28.

In general, the advancing mechanism comprises an electric motor 72 having a shaft 74 and a pivoted link mechanism including advancing lever 76, pivoted at one end on the frame, and a link 78 adapted to translate rotary motion of the shaft 74 to pivoted reciprocal movement of the advancing lever. At its free end, the advancing lever is loosely engaged by a pin 80 integral with a carriage 82, which is mounted for sliding movements on fixed supports or rods 84. It will be understood that each pivotal movement of the advancing lever will cause the carriage 82 to reciprocate to and fro on the rods 84.

As illustrated in FIGURES 11 to 14, the carriage provides a pivotal mount for a pair of advancing pawls 86 and 88, each of which has a separate function. Specifically the pawl 86 functions to move the trays in the guide means 32 between successive positions of register between the camera and light source. The pawl 88 functions to disengage the tray from the advancing mechanism, following the last position of register obtained by the pawl 86. Apertures 87 and 89, in the carriage 82, permit these pawls to protrude a desired distance above the carriage for movement in the slot 94 of the guide (FIGURE 5). The carriage also supports a tripping lug 60 adapted to engage a bent leg 49 of the arm 48, and thereby periodically disengage the holding lug 44.

Figure 11:
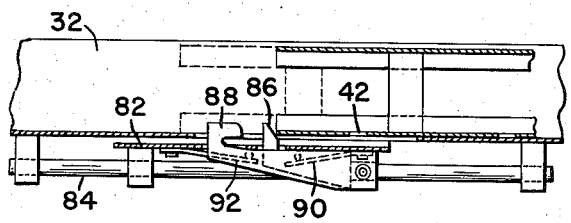
Figure 16:
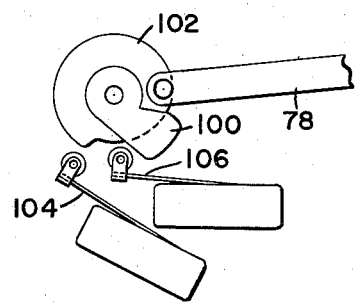
Figure 12:
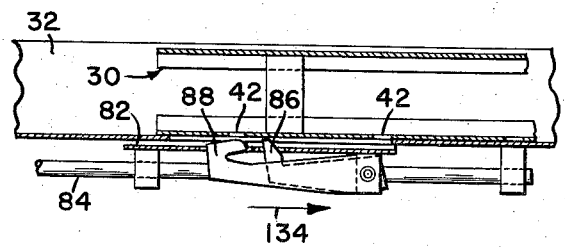

In the illustrated sequence of tray positions, FIGURE 11 shows a position of the tray corresponding to the position of FIGURE 9. In this position both pawls are biased into an up position by leaf springs 90 and 92 (engageable with pins 93 carried by the pawls). Each of the pawls is cammed so that upon movement of the tray to the left, both will be pivoted downwardly (e.g., as in FIGURE 12). This movement will initially cause the pawl 86 to move up into the first aperture 42 of the tray, to perform a momentary holding function similar to that obtained by the pawl 44.

The carriage 82 is now moved to the right by the advancing mechanism 70 (e.g. from the position of FIGURE 11 to the position of FIGURE 13), causing the pawls to be depressed and moved underneath the tray until the pawl 86 engages the second aperture 42 of the tray. Upon subsequent return of the carriage to the left (e.g. to the position of FIGURE 11), the tray will be moved a predetermined distance in the guide means by the pawl 86. Thereafter each reciprocatory movement of the advancing lever 76 will repeat the operation just described, and advance the tray in stepwise fashion equal to the spacing between the apertures 42. During these operations, a spring biased roller 96 serves to align the trays in the guide means 32, and to insure proper alignment of the various pawls with the two rows of apertures 42.

It will be noted that the outermost apertures 42 are spaced relatively close to the end of the tray. This construction permits the pawl 88 to engage the trailing end of the tray and to push the tray to a discharge position removed from the advancing mechanism, and from the holding pawl 44 (FIGURE 14). Preferably the spacing is such that when the trays 30 are introduced to the equipment end to end, the spacing between the end apertures of adjacent trays is the same as the aperture spacing of an individual tray. This construction facilitates continuous automatic operation, for example in conjunction with a suitable automatic loader mechanism.

Control System (FIGURES 16 to 19)

Referring to FIGURE 5, a pair of cams 100 and 102 are carried by the shaft 74 of the motor to alternately energize the camera 16 and the advancing mechanism 70. As shown in FIGURE 6, the upper cam 100 is adapted to engage switch 104 in the cam circuit, whereas the lower cam 102 engages a switch 106 in the motor circuit for the advancing mechanism.

The control circuit for the apparatus includes a main switch 108 to energize the circuit for the light source 14 and camera 16 through the lines 110 and 112. It also energizes the "on" light 114, and the motor circuit through the lines 116 and 118. The motor circuit includes a switch 120 (FIGURE 5) which only closes when the tray 30 is in the guide means 32, a push button 122 to energize the advancing mechanism 70, and a switch 124 and holding relay 126 which induce automatic operation of the advancing mechanism. The latter circuit is de-energized when the pawl 88 pushes the tray beyond the advancing mechanism permitting the switch 120 to open. A push button 128 can also be provided for independent energization of the camera circuit.

Figure 17:
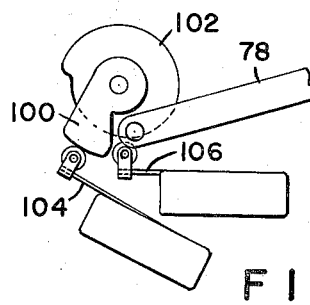

The operating sequence of the control system is as follows: The switch 108 is closed to energize the light source and camera, and a tray full of test samples inserted in the guide means to close the switch 120. Assuming automatic operation, the switch 124 is closed and the push button 122 depressed to energize the motor 72 for the advancing mechanism. At the same time the relay 126 is energized to close a switch 130 to thereby energize the holding circuit for the motor, through the line 132. Continuous operation of the motor thereafter causes the tray to be advanced in stepwise fashion, and in timed relation to closing of the switch 104 by the cam 100 (FIGURE 17). The switch 104, in turn, functions to energize the camera at each position of photographic register of a sample 28. Such position is obtained while the advancing pawl 86 is moving from left to right (arrow 134 in FIGURE 12), at which time the tray is held stationary by the holding pawl 44.

In the event a semi-automatic operation is desired, the switch 124 can be left open. The motor 72 for the advancing mechanism will then continue to operate only so long as the switch 106 is closed by the cam 102 (FIGURE 18). When the latter completes its cycle of rotation (FIGURE 16), the switch 106 opens, breaking the motor circuit.

Operation

The overall operation can be summarized as follows: The switches 108 and 124 are closed and a tray 30 inserted in the guide means 32 to the position of FIGURE 9. Upon depressing the handle 54, the tray is moved into a first position of engagement with the holding pawl 44. In this position, the test sample in the first opening 40 of the rack will be in a position of register between the light source 14 and the camera 16. If several pictures of this sample are desired, the button 128 can be employed. However, the button 122 is customarily depressed to initiate an automatic sequence through energization of the motor 72. This causes the advancing pawl 86 to successively engage in the apertures 42 and to move the tray through the guide 32 in stepwise fashion, as generally illustrated in FIGURES 11 to 14. Simultaneously the holding pawl 44 is depressed by reciprocation of the tripping lug 60, as indicated by the arrow 61 in FIGURE 10. When the last sample has been photographed and recorded, the end of the tray is engaged by the discharge pawl 88 and moved clear of the advancing mechanism. At this point a new tray 30 can be inserted into the guide means and engaged with the holding pawl 44 as previously described and the operation repeated. In this way, any number of samples in the trays 30 can be photographed, and the photographic information recorded on the film in camera 16.

The apparatus of the present invention possesses many advantages. It permits a series of samples to be photographed in repetitive sequence, to obtain a photographic record, with positive register of each sample with the camera and light source. It provides such a sequence of operations in which the recording camera is energized automatically with each advance of the tray means carrying the samples. Of particular importance is the fact that the samples can be accurately compared with one another since each is photographed and recorded under identical conditions, in a speedy, efficient process which virtually eliminates human errors.

We claim:

1. In a fluid sample inspection system a photographic recording device comprising a recording camera, a support, an illuminating light source carried by said support and disposed to project light into the camera, guide means on said support adjacent said light source, tray means movable in said guide means and formed to hold means containing a fluid sample, means to advance the tray means and fluid sample carried by same in stepwise fashion relative to the support and circuit means responsive to each stepwise advance of the tray means to energize the camera to record photographically objects illuminated by the light source.

2. A device as in claim 1 wherein said guide means is disposed to direct the movement of said tray means and fluid sample in a path passing between said camera and illuminating light source to pass light through said sample to said camera.

3. In a fluid sample inspection system a photographic recording device, a main frame supporting a light source and a recording camera, guide means on said frame in the focal plane of said camera and between said light source and camera, tray means movable in said guide means and formed to hold a plurality of fluid samples, means in stepwise fashion to advance said tray means to bring the fluid samples successively in register with the camera, and circuit means responsive to the advance of the tray means to energize the camera at each position of register of said tray means.

4. In a photographic recording device, a frame supporting a recording camera and an illuminating light source, guide means on said frame in the focal plane of said camera and between said light source and the camera, tray means movable in said guide means, said tray means including means for holding a plurality of fluid samples in a spaced apart sequence thereof, means in stepwise fashion to advance said tray means to bring successive samples carried thereby to a position of register between said camera and light source, and circuit means responsive to the advance of the tray means to energize the camera at each position of register of said tray means whereby the samples intercept light passing to said camera.

5. In a photographic recording device, a frame supporting a recording camera and an illuminating light source, guide means on said frame in the focal plane of said camera and between said light source and the camera, tray means movable in said guide means, said tray means including means for holding a plurality of fluid samples in a spaced apart sequence thereof, means in stepwise fashion to advance said tray means to bring successive samples carried thereby to a position of register between said camera and light source, said tray advancing means including means for selectively positioning the first sample in said sequence to said position of register and automatically operative thereafter to step said tray means to carry successive samples into said position of register, and circuit means responsive to the advance of the tray means to energize the camera during retention of each sample at said position of register.

References Cited in the file of this patent
UNITED STATES PATENTS

| | | |
|---|---|---|
| 1,675,967 | Zitkawski | July 3, 1928 |
| 2,052,840 | Nussbaum | Sept. 1, 1936 |
| 2,129,001 | Goehner | Sept. 6, 1938 |
| 2,335,189 | Mayer | Nov. 23, 1943 |
| 2,630,743 | O'Kane | Mar. 10, 1953 |
| 2,725,782 | Worley | Dec. 6, 1955 |
| 2,787,190 | McWhirter et al. | Apr. 12, 1957 |
| 2,798,605 | Richards | July 9, 1957 |